United States Patent
Ording et al.

(10) Patent No.: US 6,328,231 B1
(45) Date of Patent: *Dec. 11, 2001

(54) COMPRESSED NATURAL GAS INJECTOR HAVING IMPROVED LOW NOISE VALVE NEEDLE

(75) Inventors: Richard B. Ording, Williamsburg; James H. Cohen, Virginia Beach, both of VA (US)

(73) Assignee: Siemens Automotive Corporation, Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,176

(22) Filed: May 26, 1999

Related U.S. Application Data

(60) Provisional application No. 60/086,937, filed on May 27, 1998, and provisional application No. 60/086,939, filed on May 27, 1998.

(51) Int. Cl.[7] .................................................. B05B 1/30
(52) U.S. Cl. ............................ 239/585.1; 239/590.3
(58) Field of Search .......................... 239/585.1–585.5, 239/533.2–533.12, 590.3; 251/129.21, 129.18, 129.15

(56) References Cited

U.S. PATENT DOCUMENTS

| | | | |
|---|---|---|---|
| 2,291,968 | 8/1942 | Keefe | 175/336 |
| 3,662,987 | 5/1972 | Schlagmuller et al. | 251/139 |
| 3,731,881 | 5/1973 | Dixon et al. | 239/585 |
| 3,937,855 | 2/1976 | Gruenwald | 427/54 |
| 4,331,317 | 5/1982 | Kamai et al. | 251/139 |
| 4,586,017 | 4/1986 | Laskaris et al. | 338/32 S |
| 4,662,567 | 5/1987 | Knapp | 239/585 |
| 4,688,723 | 8/1987 | Kern et al. | 239/391 |
| 4,693,227 | 9/1987 | Satou | 123/575 |
| 4,783,009 | 11/1988 | Coates | 239/580 |
| 4,909,447 | 3/1990 | Gallup et al. | 239/585 |
| 4,922,862 | 5/1990 | Casacci | 123/1 A |
| 4,946,107 | 8/1990 | Hunt | 239/585 |

(List continued on next page.)

FOREIGN PATENT DOCUMENTS

| | | |
|---|---|---|
| 196 27 939 C1 | 7/1996 | (DE) . |
| 196 38 201 A1 | 9/1996 | (DE) . |
| 2 044 986 A | 10/1980 | (GB) . |

*Primary Examiner*—Andres Kashnikow
*Assistant Examiner*—Dinh Q. Nguyen

(57) ABSTRACT

An electromagnetically operable fuel injector for a fuel injection system of an internal combustion engine, the injector having a generally longitudinal axis, and including a ferromagnetic core, a magnetic coil at least partially surrounding the ferromagnetic core, and an armature magnetically coupled to the magnetic coil and being movably responsive to the magnetic coil. The armature is adapted to actuate a valve closing element interactive with a fixed valve seat and being movable away from the fixed valve seat when the magnetic coil is excited. The armature has a generally cylindrical shape and a generally central opening defining a through-passage for reception of fuel from a fuel inlet connector positioned adjacent thereto. A valve-closing element is attached to the armature and is positioned to be selectively moved toward and away from the fixed valve seat. The valve closing element is in the form of an elongated valve needle having a generally central shaft portion and a generally cylindrical end portion, the generally cylindrical end portion having a diameter greater than the generally central shaft portion and a sealing end surface having a spherical shape. Although gaseous fuels such as compressed natural gas are primarily contemplated, the invention is applicable for use with liquid fuels.

23 Claims, 7 Drawing Sheets

U.S. PATENT DOCUMENTS

| | | | |
|---|---|---|---|
| 4,978,074 | 12/1990 | Weinand | 239/585 |
| 4,988,967 | 1/1991 | Miller et al. | 335/279 |
| 5,025,554 | 6/1991 | Dohi | 29/860 |
| 5,033,716 | 7/1991 | Mesenich | 251/129.21 |
| 5,035,360 | 7/1991 | Green et al. | 239/585 |
| 5,046,472 * | 9/1991 | Linder | 239/585.4 |
| 5,092,305 | 3/1992 | King | 123/575 |
| 5,127,585 | 7/1992 | Mesenich | 239/585.5 |
| 5,129,381 | 7/1992 | Nakajima | 123/531 |
| 5,174,505 | 12/1992 | Shen | 239/417.3 |
| 5,232,167 | 8/1993 | McCormick et al. | 239/585.5 |
| 5,301,874 | 4/1994 | Vogt et al. | 239/585.4 |
| 5,341,994 | 8/1994 | Wakeman | 239/585.5 |
| 5,344,081 | 9/1994 | Wakeman | 239/585.4 |
| 5,373,992 | 12/1994 | Reiter | 239/585.5 |
| 5,381,966 | 1/1995 | Gernert, II et al. | 239/585.3 |
| 5,383,606 | 1/1995 | Stegmaier et al. | 239/575 |
| 5,494,223 * | 2/1996 | Hall et al. | 239/585.5 |
| 5,494,224 | 2/1996 | Hall et al. | 239/585.5 |
| 5,566,920 * | 10/1996 | Romann et al. | 239/585.4 |
| 5,609,304 | 3/1997 | Sasao | 239/585.4 |
| 5,613,640 * | 3/1997 | Furuya et al. | 239/585.5 |
| 5,628,294 | 5/1997 | Krieckaert et al. | 123/525 |
| 5,632,467 * | 5/1997 | Just et al. | 239/585.4 |
| 5,678,767 * | 10/1997 | Rahbar | 239/585.1 |
| 5,704,553 | 1/1998 | Wieczorek et al. | 239/585.1 |
| 5,730,367 | 3/1998 | Pace et al. | 239/408 |
| 5,735,253 | 4/1998 | Perotto et al. | 173/575 |
| 5,758,865 | 6/1998 | Casey | 251/129.21 |
| 5,785,251 | 7/1998 | Wood et al | 239/417.3 |
| 5,794,860 | 8/1998 | Neumann | 239/585.3 |
| 5,860,601 | 1/1999 | Egizi | 239/533.12 |
| 5,915,626 | 6/1999 | Awarzamani et al. | 239/135 |
| 5,918,818 | 7/1999 | Takeda | 239/585.1 |
| 5,921,475 | 7/1999 | DeVries et al. | 239/585.4 |
| 5,927,613 | 7/1999 | Koyanagi et al. | 239/585.1 |
| 5,996,912 | 12/1999 | Ren et al. | 239/585.5 |
| 6,000,628 | 12/1999 | Lorraine | 239/87 |
| 6,003,791 * | 12/1999 | Reiter | 239/590.3 |
| 6,027,050 | 2/2000 | Rembold et al. | 239/585.5 |

* cited by examiner

COMPRESSED NATURAL GAS INJECTOR HAVING IMPROVED LOW NOISE VALVE NEEDLE

CROSS-REFERENCE TO RELATED APPLICATION

This application expressly claims the benefit of earlier filing date and right of priority from the following co-pending patent applications: U.S. Provisional Application U.S. Ser. No. 60/086,937, entitled "Contaminant Tolerant Compressed Natural Gas Injector" filed May 27, 1998; and U.S. Provisional Application U.S. Ser. No. 60/086,939, entitled "Needle Valve For Low Noise Fuel Injector" filed May 27, 1998. Both cited provisional patent applications are expressly incorporated in their entirety by reference.

BACKGROUND OF THE INVENTION

1. Field of the Invention

The present application relates to a compressed natural gas injector, which incorporates an improved low noise valve needle.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to help reduce the effects of contaminants in the fuel.

Compressed natural gas is delivered throughout the country in a pipeline system and is mainly used for commercial and residential heating. While the heating systems can tolerate varying levels of quality and contaminants in the CNG, the tolerance levels in automotive gas injectors are significantly lower.

These contaminants, which have been acceptable for many years in CNG used for heating, affect the performance of the injectors to varying levels and will need to be considered in future CNG injector designs. Some of the contaminants found in CNG are small solid particles, water, and compressor oil. Each of these contaminants needs to be addressed in the injector design for the performance to be maintained over the life of the injector.

The contaminants can enter the pipeline from several sources. Repair, maintenance and new construction to the pipeline system can introduce many foreign particles into the fuel. Water, dust, humidity and dirt can be introduced in small quantities with ease during any of these operations. Oxides of many of the metal types found in the pipeline can also be introduced into the system. In addition, faulty compressors can introduce vaporized compressor oils, which blow by the seals of the compressor and enter into the gas. Even refueling can force contaminants on either of the refueling fittings into the storage cylinder. Many of these contaminants are likely to reach vital fuel system components and alter the performance characteristics over the life of the vehicle.

In addition to contaminants in the CNG, presently known valve components of fuel injectors have been known to present certain disadvantages, when used with CNG as well as with liquid fuels. For example, the armature and valve needle of a typically known injector produces distinguishable sounds upon opening of the valve and on closing of the valve. In particular, the force of impact, which is equal to the valve component mass multiplied by acceleration, can generate sounds within an engine compartment, which are generally perceived as either a mechanical problem or otherwise harsh and objectionable noise.

In general, fuel injectors require extremely tight tolerances on many of the internal components to accurately meter the fuel. For CNG injectors to remain contaminant tolerant, the guide and impact surfaces for the armature needle assembly require certain specifically unique characteristics. Also, the valve needles are difficult to control precisely, given the specific environment provided by the CNG. We have invented a CNG fuel injector which represents a significant improvement over presently known injectors which incorporates an improved valve needle having reduced needle mass and providing low noise on closing.

SUMMARY OF THE INVENTION

The invention relates to an electromagnetically operable fuel injector for a fuel injection system of an internal combustion engine, the injector having a generally longitudinal axis, which comprises, a ferromagnetic core, a magnetic coil at least partially surrounding the ferromagnetic core, an armature magnetically coupled to the magnetic coil and being movably responsive to the magnetic coil, the armature being adapted to actuate a valve closing element interactive with a fixed valve seat and being movable away from the fixed valve seat when the magnetic coil is excited. The armature has a generally elongated shape and a generally central opening for axial reception of fuel from a fuel inlet connector positioned adjacent thereto. A valve closing element is attached to the armature and positioned to be selectively moved toward and away from a generally frusto-conically shaped fixed valve seat, the valve closing element being an elongated valve needle having a generally central shaft portion and a generally cylindrical end portion. The generally cylindrical end portion of the valve needle has a diameter greater than the generally central shaft portion, and having a generally spherical end surface for sealing engagement with the fixed valve seat.

Preferably the fuel inlet connector extends in a generally longitudinal direction above the armature and defines a path for fuel to enter the inlet connector and to be directed toward the armature, the fuel inlet connector having a lowermost surface spaced above the armature to define a working gap through which the armature is movable. The armature has a fuel reception portion for receiving fuel directed from the fuel inlet connector and directing the fuel toward the fixed valve seat for entry into an intake manifold of the engine. The fuel inlet connector and the armature are adapted to permit a first flow path of gaseous fuel between the armature, the magnetic coil, and a valve body shell as part of a path leading to the fuel valve. The armature defines at least one first fuel flow aperture extending through a wall portion thereof to define a second flow path of gaseous fuel as part of a path leading to the fuel valve. The armature defines at least one-second aperture in a wall portion thereof to define a third flow path of gaseous fuel as part of a path leading to the fuel valve. The at least one second aperture is oriented at a generally acute angle with respect to the longitudinal axis.

The fuel injector further comprises a valve body positioned downstream of the armature and having at least one aperture in a wall portion thereof for reception of fuel from at least two of the flow paths of gaseous fuel from the armature and the fuel inlet connector. The fuel inlet connector is positioned above the armature and is spaced from the armature by the working gap, the fuel inlet connector defining a through passage for directing fuel toward the armature and the fixed valve seat. The fuel inlet connector comprises an upper end portion adapted for reception of gaseous fuel from a fuel source, and a lower end portion for discharging gaseous fuel, the lower end portion having a lower surface which faces an upper surface of the armature, the lower surface of the fuel inlet connector having a plurality of radially extending raised pads defined thereon, the pads having recessed portions therebetween to permit fuel to flow therethrough and across the working gap defined between the fuel inlet connector and the armature. The generally cylindrical end portion of the valve needle has a generous radius at the lower end portion thereof for engagement with a correspondingly shaped surface of the valve seat. The valve needle is attached to said armature by crimped portions, and the correspondingly shaped surface of the valve seat preferably has a generally frust-oconical cross-sectional shape. The fuel inlet connector further includes a fuel filter at an upper end portion thereof for filtering fuel.

The valve needle is a generally elongated valve needle having a spherically shaped end portion and configured and adapted to engage a frusto-conically shaped surface of the fixed valve seat to closed the valve, and movable therefrom to open the valve to permit fuel to pass therethrough toward the internal combustion engine. The generally elongated valve needle is comprised of a generally elongated generally central shaft section having a first diameter, and a free end section having a second diameter greater than the first diameter, the free end section having a spherically shaped end valve sealing surface adapted to engage the frusto-conically shaped surface of the fixed valve seat. The valve needle is connected to the lower end portion of the armature by crimped portions, and the spherically shaped surface on the needle has a diameter approximately 1.75 millimeters.

A lower needle guide is positioned about the greater diameter portion of the needle to guide the upward and downward movement of the needle. Preferably, the center of the radius defining the spherically shaped surface of the needle is located generally coincident with the lower needle guide. The center of the spherically shaped needle end surface is preferably located at the center of the widthwise dimension of the lower needle guide and coincident with the lowermost surface of the lower needle guide.

The fuel injector further comprises a valve body positioned downstream of the armature and having at least one aperture in a wall portion thereof for reception of fuel from at least two of the flow paths of gaseous fuel from the armature and the fuel inlet connector. The fuel inlet connector is positioned above the armature and is spaced from the armature by the working gap, the fuel inlet connector defining a through passage for directing fuel toward the armature and the fixed valve seat. The fuel inlet connector comprises an upper end portion adapted for reception of gaseous fuel from a fuel source, and a lower end portion for discharging gaseous fuel, the lower end portion having a lower surface which faces an upper surface of the armature, the lower surface of the fuel inlet connector having a plurality of radially extending raised pads defined thereon, the pads having recessed portions therebetween to permit fuel to flow therethrough and across, working gap defined between said fuel inlet connector and said armature.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figure 1:
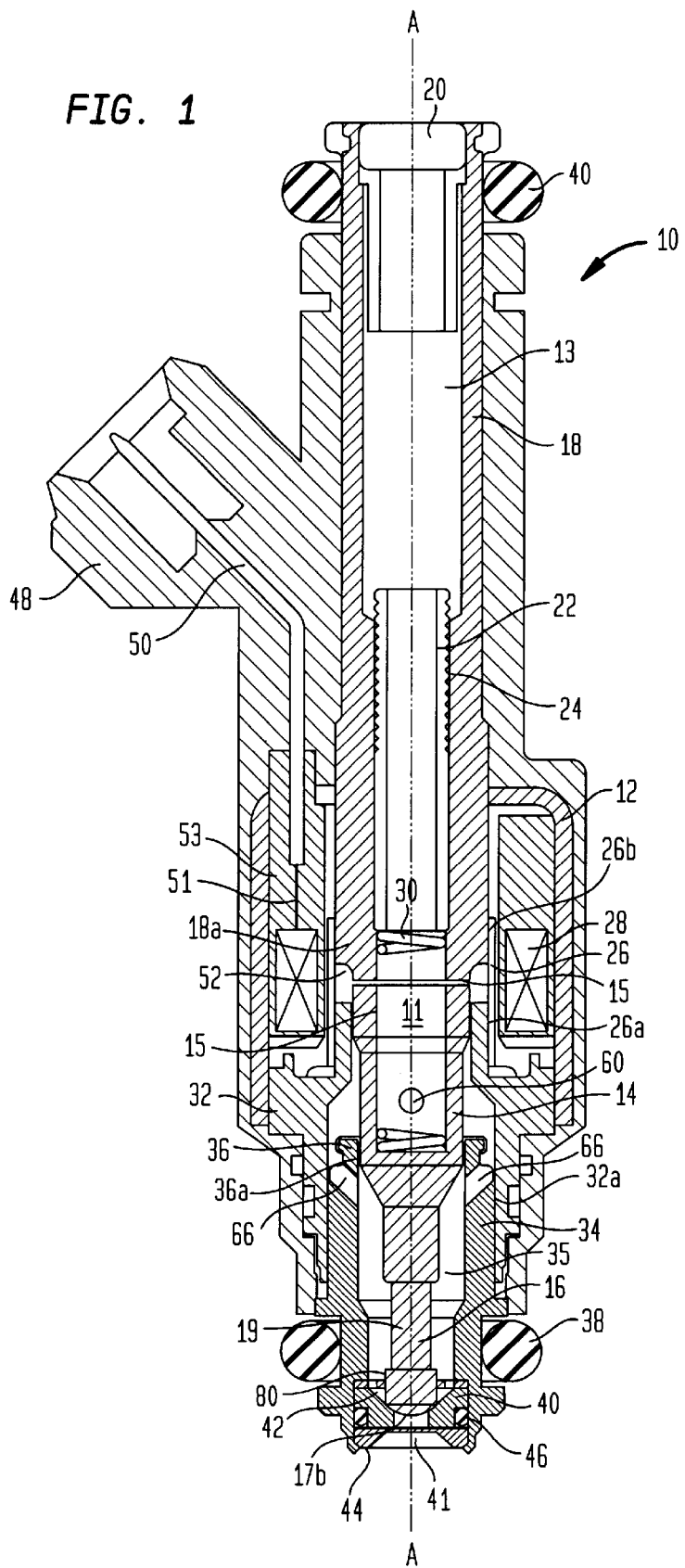
FIG. 1 is an elevational view, partially in cross-section, of a compressed natural gas injector constructed according to the invention and incorporating the improved needle according to the invention.

Referring initially to FIG. 1 there is shown a CNG injector 10 which is constructed according to the present invention. Injectors of the type contemplated herein are described in commonly assigned U.S. Pat. No. 5,494,224, the disclosure of which is incorporated by reference herein.

The injector 10 includes housing 12 containing armature 14 to which valve needle 16 is attached by crimping as will be described later in conjunction with FIG. 8. Fuel inlet connector 18 includes central fuel flow opening 13 and CNG filter 20 at the upper end portion of opening 19 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and inlet connector 18 define with housing 12, an enclosure for coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown).

Figure 2:
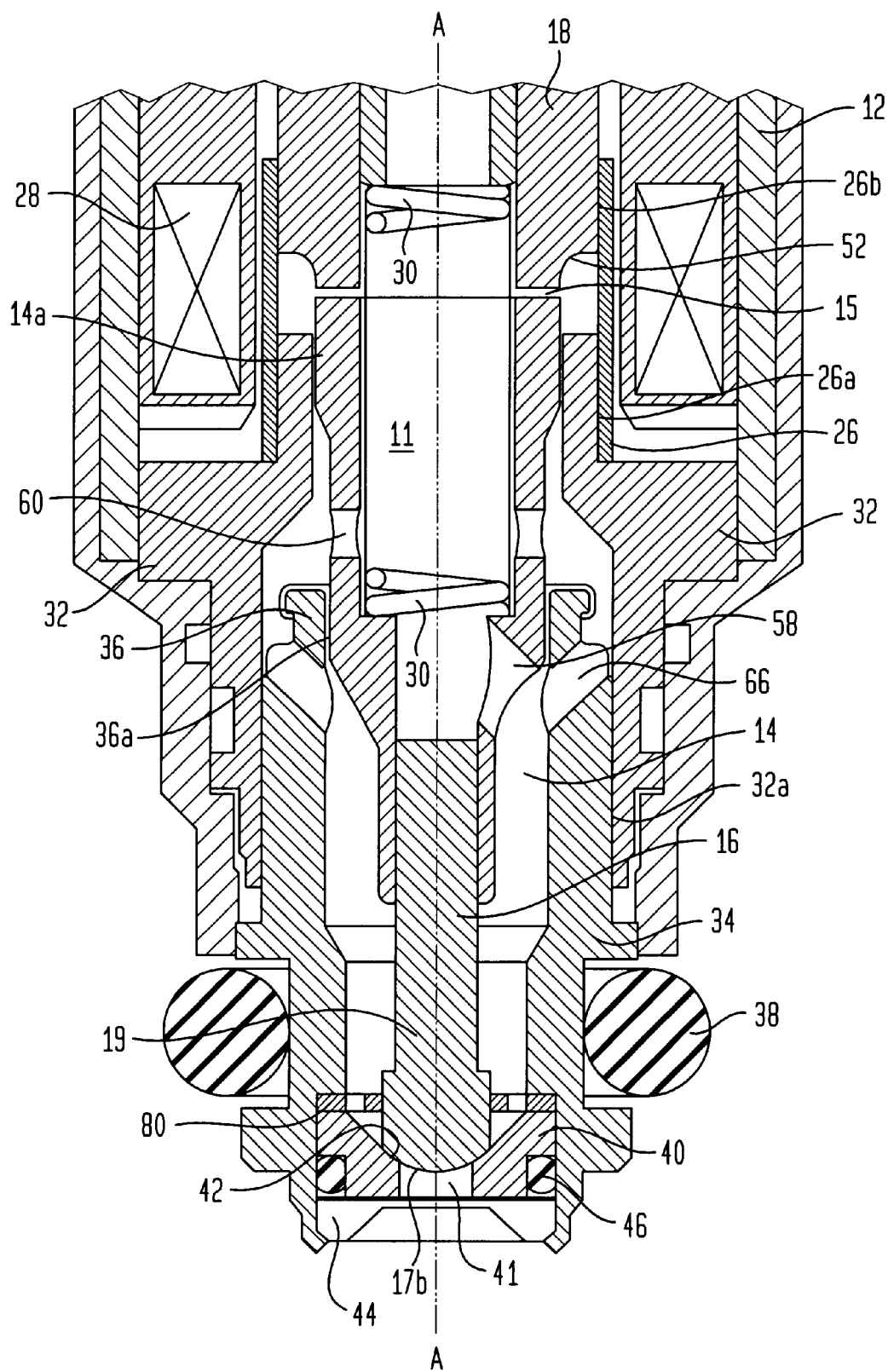
FIG. 2 is an enlarged elevational cross-sectional view of the lower portion of the injector of FIG. 1, showing the improved armature and needle combination which forms part of the present invention.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 40 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector at 26b. Thus, fuel flowing from fuel inlet connector 18 across working gap 15 must flow through the clearance space 14a between armature 14 and valve body shell 32 which is also provided to permit upward and downward movement of armature 14. The space 14a is approximately 0.10 to 0.30 mm on the diameter of the armature 14.

Referring again to FIGS. 1 and 2, valve seat 40 contains a valve orifice 41 and a funnel shaped needle rest 42 having a frusto-conical cross-sectional shape. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Coil 28 is surrounded by dielectric plastic material 53 as shown in the FIGS.

Figure 3:
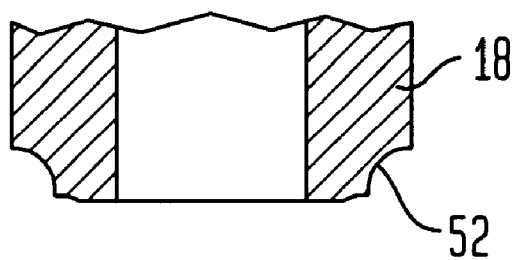
FIG. 3 is a partial elevational cross-sectional view a preferred embodiment of the lower end portion of the fuel inlet connector of the injector shown in FIG. 1.

Significant features of the present invention are provided inter alia, to eliminate the aforementioned erratic valve closing and improve the operation of the injector. In FIG. 3, the lower end portion 18a of inlet connector 18 is configured as shown by the arcuately chamfered end 52. This configuration provides a beneficial effect in that it directs and orients the magnetic field across the working gap 15 in a manner which optimizes the useful magnetic force created for moving the armature through the working gap. This feature is disclosed in commonly assigned, commonly filed (Attorney Docket No. 98P7677US01) copending application entitled "Contaminant Tolerant Compressed Natural Gas Injector and Method of Directing Gaseous Fuel Therethrough, the disclosure of which is incorporated herein by reference.

Figure 4:
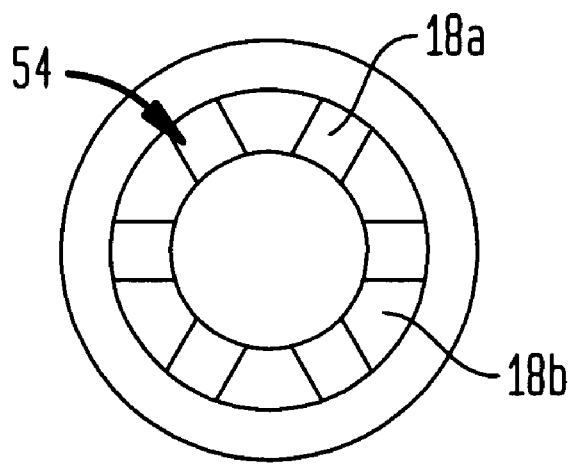
FIG. 4 is a plan view of the bottom surface of the preferred fuel inlet connector shown in FIG. 1.

As shown in FIG. 4, radial slots in the form of recessed surfaces 18a are provided in the lowermost surface of inlet connector 18 to reduce the effective contact surface area between the armature and the inlet connector by about one third of the total cross-sectional area which was utilized in prior art conventional injectors. This configuration provides six coined pads 18b of about 0.05 mm in height, thus creating six corresponding rectangular shaped radial slots 18a to provide fuel flow paths. By reducing, the effective surface area of the lowermost face of the inlet connector 18 as shown, the tendency to develop an attractive force between the inlet connector 18 and the armature 14 is significantly reduced to about one-third of its original value, and the ability to tolerate fuel contaminants at the interface without producing an attractive force therebetween is also significantly increased. As noted, preferably, the rectangular radial slots 18a are of a shallow depth, i.e. about 0.05 mm, (i.e., millimeters) in order to provide the benefit of reducing the inlet connector/armature interface surface area while still providing a relatively unobtrusive location for collection of solid contaminants which are ultimately removed by the flow of gaseous CNG.

As noted, the provision of recessed surfaces 18a in the lowermost surface of inlet connector 18 creates raised pads 18b on the surface, which pads improve the tolerance of the injector to fuel contaminants in several ways. The recessed surfaces 18a may be made by any suitable process, but are preferably coined. The first effect is to reduce the contact area of the inlet connector at the armature interface, thereby significantly reducing any attractive force generated therebetween by liquid contaminants such as oil or water. Furthermore, as noted, the radial pads 18b provide hidden areas between the pads where contaminants can collect without affecting the operative working gap 15 until being drawn away by the fuel flow. The working gap for gasoline is about 0.08 mm to about 0.14 mm, and about 0.3 mm for compressed natural gas. In addition, as noted, the provision of the six rectangular recessed portions in the form of six slots 18a and six raised pads 18b, each preferably having a generally trapezoidal shape as shown, on the inlet connector, provide a unique fuel flow path past the inlet connector/armature interface in a manner which causes the gaseous fuel to pass transversely through the working gap 15 as shown at 56 in FIG. 5 and allow for the control of the fuel flow around and through the armature by controlling the pressure losses. Also, by controlling the sizes of the recessed surfaces 18a and raised pads 18b, and the various apertures 58, 60, 66 in the armature and the valve body as will be described—as well as the numbers and combinations of such openings—the fuel flow can be controlled over at least three flow paths and pressure losses can also be controlled. For example, a small pressure differential across the armature while fully open, assists spring 30 during breakaway upon closing and provides dampening on opening impact. The additional fuel flow path also reduces the possibility of contaminants collecting above upper guide 36 as shown in FIG. 2. In summary, numerous combinations of apertures and sizes thereof—as well as slots and pads on the fuel inlet connector—can be made to direct the gaseous fuel flow in any desired manner which is best for optimum fuel burning and engine application.

Figure 5:
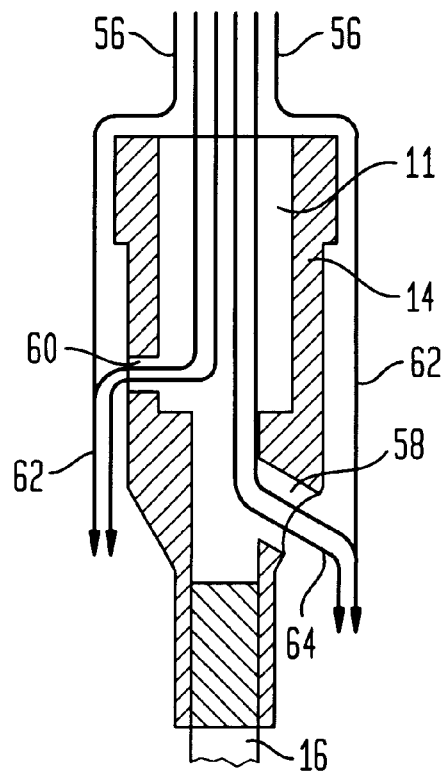
FIG. 5 is an elevational cross-sectional view of a preferred embodiment of the armature shown in FIG. 1 and illustrating the improved fuel flow path resulting therefrom.
Figure 6:
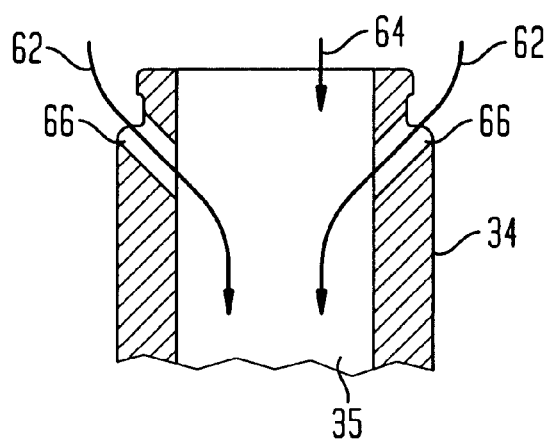
FIG. 6 is an elevational cross-sectional view of the upper portion of a preferred embodiment of the valve body shown in FIG. 1.

Referring now to FIGS. 5 and 6 in conjunction with FIGS. 1–3, there is illustrated still another significant improvement which renders the fuel injector assembly more fully capable of operation with CNG. In prior art injectors which were used with relatively contaminant free fuels the fuel would pass through the filter down through the inlet connector into the armature and out an opening positioned relatively close to the lowest portion of the armature which was located substantially immediately above the valve aperture. In the present structure there is provided a relatively diagonally oriented aperture 58 shown in FIG. 5 which directs the CNG flow therethrough and downwardly toward valve aperture 41 for entry into the intake manifold of the internal combustion engine. As shown in FIG. 5, aperture 58 forms a generally acute angle with longitudinal axis A—A. In addition, the armature of the present invention provides at least one side opening 60 which is generally transverse to the longitudinal axis A—A of the fuel injector 10, to permit fuel flowing downwardly through the center of the armature to be directed sidewardly out of the armature and thereafter downwardly toward the valve aperture 41 shown in FIG. 1. In the embodiment shown in FIG. 1, aperture 60 is generally horizontal, but may be oriented at an angle to the longitudinal axis if desired. Aperture 58 is not shown in the cross-sectional view of FIG. 1. The fuel flowing through aperture 60 is indicated by the flow lines 62 and the fuel flowing through aperture 58 is indicated schematically in FIG. 5 by flow lines 64. Optionally several additional horizontal apertures 60 may be provided in the armature at different radial locations thereabout, or alternatively as shown, one aperture 60 may be provided, depending upon the fuel flow pattern sought in each particular instance. It can be seen that the fuel flow from the fuel inlet connector 18 is divided into three paths, a first path expanding across working gap 15, a second path through aperture(s) 60, and a third path through aperture(s) 58. The first path extends between the armature 14 and the magnetic coil 28 and is ultimately joined by the second flow path passing through aperture(s) 60.

It can also be readily appreciated that the diameters of each aperture 58, 60 can be varied to direct the fuel flow in any predetermined desired direction. For example, by reducing the size of apertures 58,60 fuel will be encouraged to flow with increased volume cross the working gap 15. Alternatively, increasing the diameter of apertures 58, 60 will attract greater volume of fuel through those apertures and thereby reduce the fuel flow across the working gap. It has also been found that the diameters of the apertures 58, 60 and the numbers and locations of such apertures affect the damping characteristics of the valve needle 16, both upon opening and upon closing. Accordingly, the diameter of fuel flow apertures 58, 60 and the numbers, locations, and orientations of such apertures will depend upon the desired volumetric flow characteristics and desired flow patterns in each instance; however diameters within the range of 1–2 mm have been found to be preferable.

Referring now to FIG. 6, a valve body 34 is also provided with central fuel flow opening 35 and several diagonally oriented fuel path apertures 66 which are intended to receive the CNG fuel flowing from the first and second flow paths from the working gap 15 and aperture(s) 60 along the sides of the armature 14 and to redirect the fuel downwardly toward the valve aperture 41 such that when the needle 16 is lifted, the fuel is permitted to enter aperture 41 and thereafter directed into the intake manifold of the engine, neither of which are shown in the drawings. Fuel flowing along the third flow path through aperture(s) 58 lead directly toward aperture 41. It has been found that the unique provisions of the apertures 58 and 60—as well as rectangular radial slots 18a on the inlet connector lowermost face— create a fuel flow pattern which induces the CNG to flow in the manner shown by the fuel flow lines at 56, 62 and 64 in FIG. 5 and such fuel flow lines actually create ideal pressure conditions to avoid causing the armature to be attracted to the inlet connector. Thus the attractive forces between the armature and inlet connector are minimized by the several factors mentioned, namely the elimination of the tendency of the oil and contaminates to accumulate in the space 15 located between the armature and the inlet connector, the reduction of the effective inlet connector/armature interface area by provision of radial pads on the face of the inlet connector, and the provision of the unique CNG flow pattern which creates a force free environment between the inlet connector and the armature.

As indicated, alternatively, apertures 60 may be provided in several locations about the circumference of the armature, and apertures 58 may be provided in several locations. However, it has been found that a single aperture on each side, as shown is sufficient to produce the desired flow path and the force free environment. Also, as noted, it should be noted that the diameter of each aperture can be altered in order to provide control of the fuel pressures and flow patterns in the areas surrounding the inlet connector, the armature, and the valve body, so as to provide a predetermined fuel flow pattern throughout the injector as may be desired.

Figure 7:
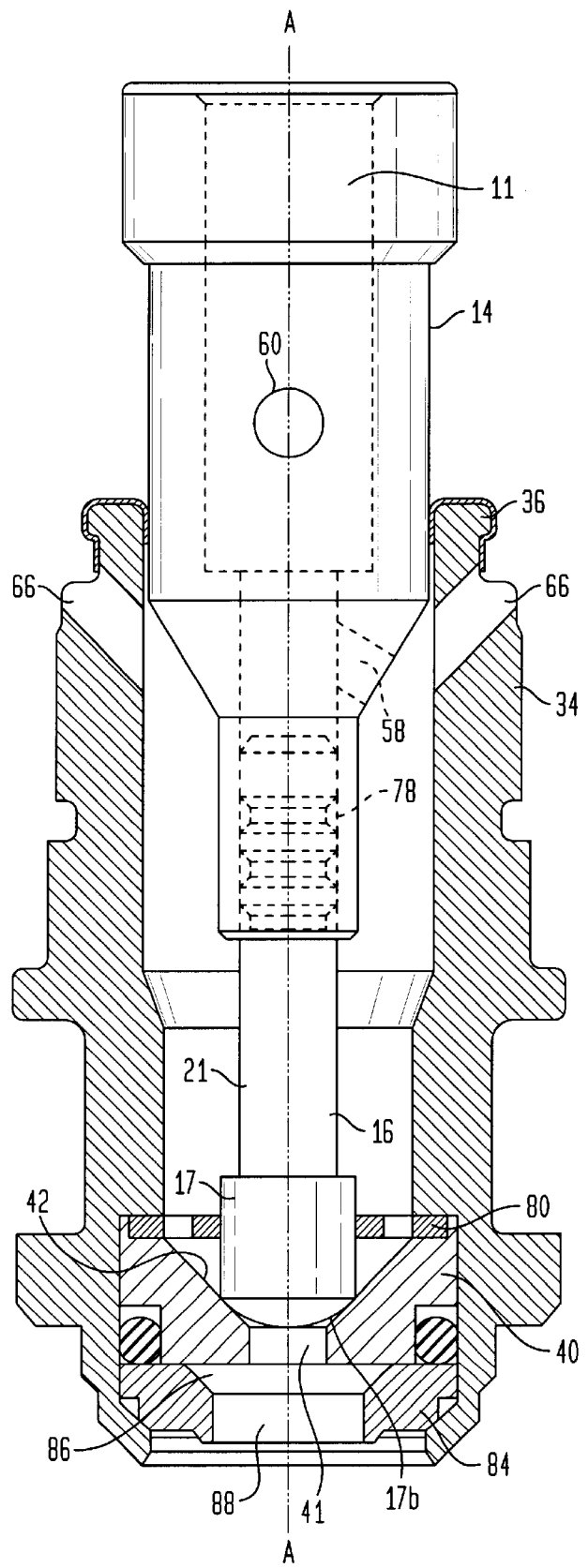
FIG. 7 is an enlarged elevational view of the armature shown in FIG. 5 and a cross-sectional view of the valve body shown in FIG. 6, incorporating an improved valve needle constructed according to the invention and a fuel columnating fuel jet flow device.
Figure 8:
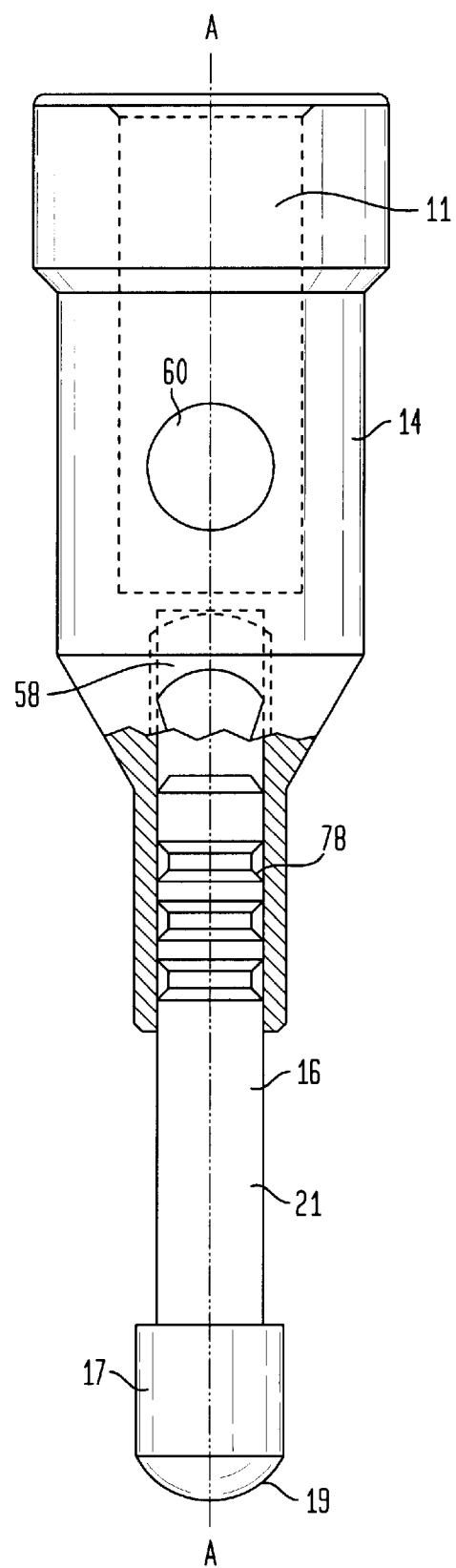
FIG. 8 is an enlarged elevational view, partially in cross-section, of the armature shown in FIG. 5, and the improved valve needle shown in FIG. 11.

Referring now to FIGS. 7 and 8 in conjunction with FIGS. 1–3, there is disclosed an enlarged elevational view of the armature the improved valve body, and the improved valve needle of the present invention. In particular, the armature 14 contains side fuel flow aperture(s) 60 and the valve body 34 contains the diagonal CNG fuel flow path openings 66. The armature 14 has attached thereto by a known crimping procedure at 78, the improved valve needle 16 of the present invention.

The improved valve components of the present fuel injector are disclosed in FIGS. 1, 7 and 8 incorporating the improved needle 16 of the invention. As noted, during operation of the fuel injector, the armature 14 moves upwardly and downwardly due to the energization and deenergization of coil 30 so as to produce alternating opening and closing contact between valve needle 16 and valve seat 40. As the needle is raised to permit the CNG fuel flow through the aperture 41 the flow passes the tip portion 17 of the needle and enters aperture 41 in its flow path toward the intake manifold of the engine.

In conventional liquid fuel injection systems having a conventional elongated needle having a continuous cylindrically shaped outer surface, the needle presents several problems and disadvantages. When applied to CNG systems, the problems inherent with conventional needles are intensified, particularly due to the changes in the gaseous environment as compared to the liquid environment. Accordingly, the present invention incorporates a novel valve needle which improves the operation characteristics of fuel injection systems, including liquid fuel and gaseous fuel types.

It has been known that when conventional valve needles engage a valve seat of a fuel injector the force of impact with conventional needles can generate sounds within the engine compartment, which are generally perceived as either a mechanical problem or otherwise harsh or objectionable noises emanating from the engine. This force of impact— which is equal to the valve component mass multiplied by the acceleration—is generally caused by the relatively substantial velocity of the needle during its movement toward the "valve closed" position in engagement with the valve seat. Accordingly, the needle 16 which forms part of the present injection system, has been structured to eliminate disadvantages of prior art needles. Although this needle has been found to improve performance with gaseous fuel injection systems as in the present invention, it has also been found to improve the performance of liquid fuel injection systems.

With the improved needle shown in FIG. 7, it has been found that it is desirable to provide a generous radius sealing portion 19 at the valve end of the needle in order to maximize the contact area between the valve needle 16 and the valve seat 40. For example, the greater the radius at the tip of the needle, the better the sealing between the needle and the valve seat 40. Preferably, the radius of the spherical sealing section 19 of needle 16 is in the order of about 1.75 millimeters (i.e., mm), or about 1.5 times the radius of the corresponding sealing surfaces in the prior art structures. However, needles which are generally known for conventional injectors of the type disclosed herein generally have a continuous outer cylindrical configuration from the upper end to the lower end, thus requiring a needle of relatively large cross-sectional area in order to provide a relatively large tip valve surface portion. The needle 16 of the present invention as shown in FIG. 7 is a relatively low mass needle as disclosed, yet includes a relatively large spherical sealing surface.

In particular, the mass of the needle has been substantially reduced by reducing the cross-sectional dimension of the shaft 19 of the needle 16 and retaining a tip portion 17 which is greater in cross-sectional dimension then the shaft of the needle as shown. This configuration effectively reduces the mass of the needle while retaining the relatively large sealing diameter of the surface 19 of the tip portion 17 so as to provide a relatively generous radius at the tip portion of the needle for engagement with the valve seat 40. It has been found that the relatively reduced mass of the needle and the relatively large radius of the tip portion 17 makes it possible to provide a generous spherical sealing surface 17b for the needle for a given amount of CNG flow. The gaseous radius also results in a shorter traveling distance for the needle 16 thereby reducing the impact velocity of the needle relative to the valve seat. It has been determined that for a predetermined flow rate, this configuration results in a significant reduction of the noise produced by the impact between the needle 16 and the valve seat 40. Furthermore, the attenuation of the apparent noise is a result of reducing the amplitude (via reduction of lift of the needle 16) and lowering the frequency (via the greater impact radius of tip portion 17) of the noise into a less objectionable region of the sound spectrum as perceived by the human ear.

In addition to reduced noise, the improved needle of the present invention provides a larger guide surface relative to the mean needle diameter, thereby improving the wear resistance of the guiding surface of lower guide 80 shown in FIG. 7. This improved wear resistance of the guide surface is due to the reduced loading compared to that of a conventional base valve guide diameter which was used with needles of the prior art. For example, a typical prior art needle will have a substantially continuous cylindrically shaped shaft which terminates at a radiussed end portion wherein the shaft diameter may be twice as much as the diameter of the shaft of the improved needle shown in FIG. 7. On the other hand, the tip portion 17 of the needle shown in FIG. 7 can be configured to have a diameter up to approximately 50% greater than the diameter of the shaft 19 of needle 16 thereby having a greater diameter than would otherwise be present in a prior art needle and thereby making provision for a lower guide 80 having a guide surface which is greater in diameter and surface area than would otherwise be utilized with prior art needles. This improves the wear resistance of the guide surface due to the reduced loading as compared to that of the conventional base valve guide diameter.

Figure 9:
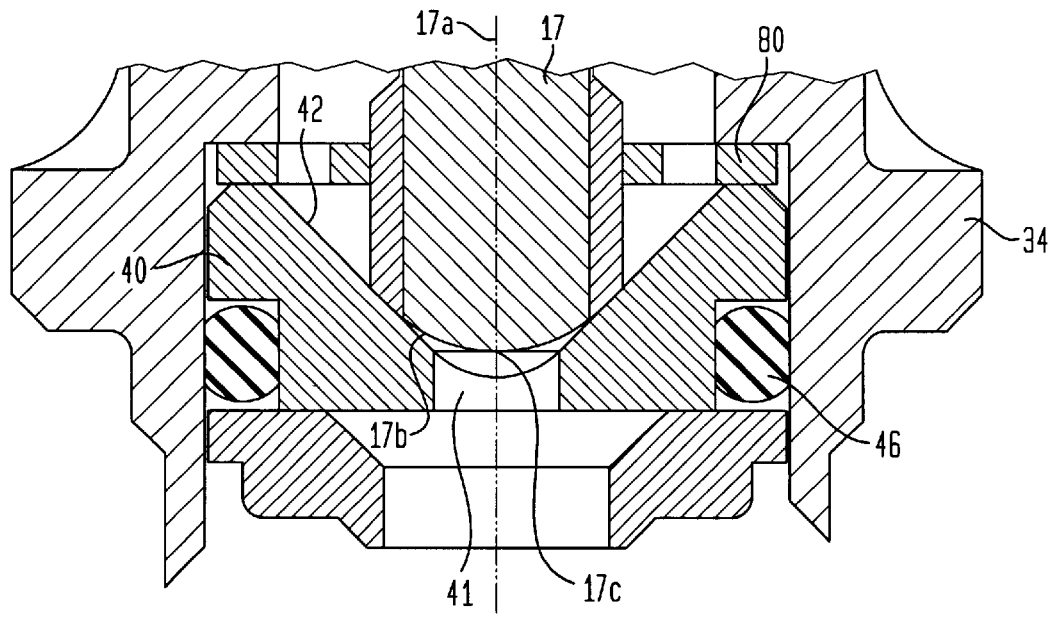
FIG. 9 is an enlarged cross-sectional view illustrating the sealing tip portion of the valve needle as seated on the fixed valve seat as shown in FIGS. 1 and 7, illustrating the preferred dimensional relationship between the needle tip, the fixed valve seat and the lower needle guide.
Figure 10:
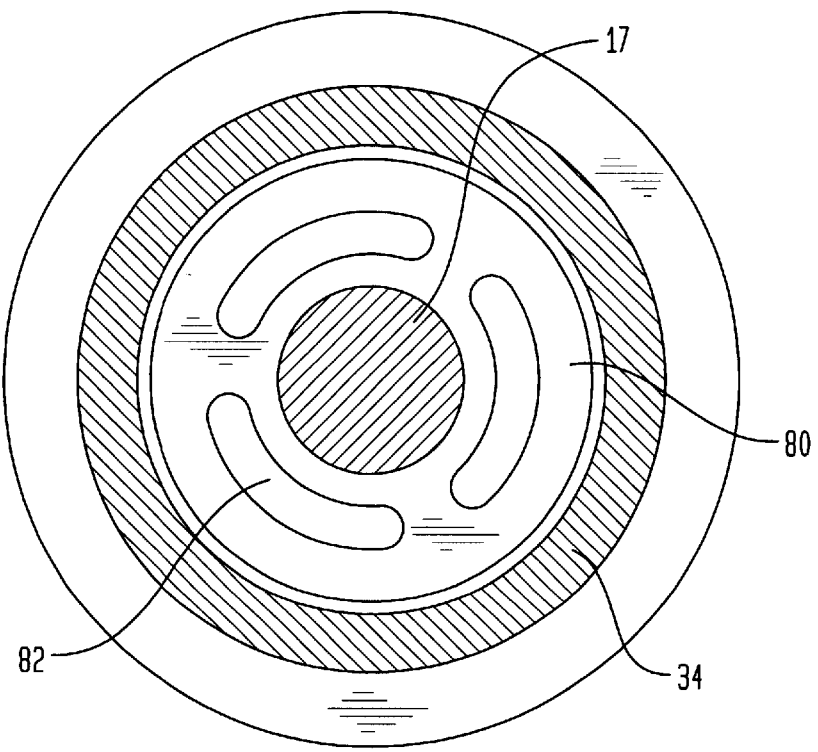
FIG. 10 is a view taken along lines 10—10 of FIG. 7, illustrating a preferred valve needle lower guide having arcuately shaped fuel passage openings.

In FIG. 9, the preferred dimensional relationship between the improved needle 16 and the funnel shaped valve needle rest 42 is shown in greater detail. As noted with respect to FIG. 1, needle 16 includes a central shaft portion and a cylindrical needle tip portion 17 having a spherical lower surface 17b which engages the similarly shaped spherical surface 17b of needle rest 42. The needle is guided by upper guide 36 as shown in FIG. 1, and lower guide 80 shown in FIGS. 9 and 10. Upper guide 36 is inherently required to provide a space between the guiding surface and the armature 14 (0.10–0.30 mm on the diameter) to permit the upward and downward motion of the armature 14 and needle 16. Thus the armature 14 and needle 16 may have the tendency to shift to the left or right at the upper guide 36 within space 36a which is about 0.10 to about 0.15 mm on the diameter.

Referring now to FIG. 9, it has been found to be advantageous to locate the center 17c of spherical sealing surface 17b of needle tip portion 17 at the center of the lowermost surface of lower guide 80 as shown, in FIG. 13 in order to assure precise seating and sealing of needle 16 on frusto-conical needle rest 42. In particular, by such positioning of the center 17a of spherical sealing surface 17b of tip portion 17, the lower guide 80 tends to constrain sideward movement of the needle tip portion 17 caused within upper guide 36, and effectively becomes a nodal point about which needle tip portion 17 is capable of rotating over 360 degrees of motion. Thus any sideward movement of the needle which occurs at the level of upper guide 36 will cause the needle to pivot about the center point 17a and promote self seating of sealing surface 17b on needle rest 42. This self-seating feature also applies in the event that any misalignment or manufacturing tolerance buildup occurs in the relationship between upper guide 36 and needle 16.

As noted, the present needle 16 is advantageous for use with injectors which utilize CNG as is contemplated herein, as well as with injectors which utilize liquid fuels, such as gasoline. In particular, in injectors utilizing liquid fuels, the motion of the valve needle is also damped by displacement of fluid across the extended valve seal face and the valve seat which further reduces the impact force and uncontrolled secondary injections upon closure caused by the valve needle when it rebounds away from the valve seat. In such injectors used with liquid fuels, valve rebound produces quantities of low velocity fuel droplets after the needle started to close. Valve rebound dampening minimizes low volume/velocity fuel transfer to the orifice. Thus, the dampening of the needle rebound improves the operation of the injector by minimizing low volume/low velocity fuel transfer to the fuel valve aperture 41 and the surrounding area which tends to extendedly suspend fuel droplets via surface tension when liquid fuels are used. Valve rebound dampening has also been found to be beneficial in the present injector which is contemplated for use with gaseous CNG.

Referring now to FIG. 8, the armature 14 is illustrated with valve needle 16 crimped thereto at 78 by known crimping procedures; however, valve body 34 has been eliminated for purposes of clarity of illustration in the enlarged view of armature 14 and needle 16. In FIG. 8, the illustration of needle 16 clearly shows the main shaft portion 19 and the enlarged tip portion 17 with enlarged valve spherical sealing surface 17b which conveniently engages and disengages seat area 42 of valve seat 40 as described in conjunction with FIG. 13.

It has been found that the injector incorporating the valve needle of the present invention provides improved operation by improving the sealing characteristics of the needle type valve, which is incorporated herein. As noted hereinabove, due to the improved needle, noise characteristics and needle dampening both upon opening and upon closing, have been significantly improved with the result that the injector as shown and described is significantly improved for use both with liquid fuels such as gasoline, and with gaseous fuels such as compressed natural gas (CNG).

Although the invention has been described in detail with reference to the illustrated preferred embodiments, variations and modifications may be provided within the scope and spirit of the invention as described and as defined by the following claims.

What is claimed is:

1. An electrically operable fuel injector for a fuel injection system of an internal combustion engine, said injector having a generally longitudinal axis, which comprises:
   a) a ferromagnetic core;
   b) a magnetic coil at least partially surrounding said ferromagnetic core;

c) an armature magnetically coupled to said magnetic coil and movably responsive to said magnetic coil, said armature being adapted to actuate a valve closing element interactive with a fixed valve seat being movable away from said fixed valve seat when said magnetic coil is excited, said armature having a generally elongated shape, a generally central opening for axial reception of fuel from a fuel inlet connector positioned adjacent thereto, a first aperture transverse to the longitudinal axis and a second aperture oblique to the longitudinal axis, the first and second apertures adapted to allow fuel flow therefrom; and d) a valve closing element attached to said armature and positioned to be selectively moved toward and away from a generally frusto-conically shaped fixed valve seat, said valve closing element being an elongated valve needle having a generally central shaft portion and a generally cylindrical end portion, said generally cylindrical end portion having a diameter greater than said generally central shaft portion and having a generally spherical end surface for sealing engagement with said fixed valve seat.

2. An electrically operable fuel injector for a compressed natural gas fuel injection system of an internal combustion engine, said injector having a generally longitudinal axis, which comprises;

a) a ferromagnetic core;

b) a magnetic coil at least partially surrounding said ferromagnetic core;

c) an armature coupled to said magnetic coil and movably responsive to said magnetic coil, said armature having a first upper end face and a lower end portion;

d) a valve closing element connected to said lower end portion of said armature and interactive with a fixed valve seat of a fuel valve to selectively permit fuel to pass through said valve seat as said valve closing element is moved to a valve open position by said armature, said valve closing element being an elongated valve needle having a generally central shaft portion and a generally cylindrical end portion having a diameter greater than said generally central shaft portion and defining a generally spherical end surface adapted to engage and interact with a correspondingly shaped and dimensioned surface on said valve seat to selectively close said valve; and e) a fuel inlet connector extending in a generally longitudinal direction above said armature and defining a path for fuel to enter said inlet connector and to be directed toward said armature, said fuel inlet connector having a lowermost surface spaced above said armature to define a working gap through which said armature is movable, the fuel inlet connector and the armature being adapted to permit a first flow path of gaseous fuel between the armature and the magnetic coil as part of a path leading to the fuel valve;

said armature having a fuel reception portion for receiving fuel directed from said fuel inlet connector and directing the fuel toward said fixed valve seat for entry into an intake manifold of the engine, and said armature defining at least one first fuel flow aperture extending through a wall portion thereof to define a second flow path of gaseous fuel as part of a path leading to said fuel valve.

3. The electromagnetically operable fuel injector according to claim 2, wherein said armature defines at least one second aperture in a wall portion thereof to define a third flow path of gaseous fuel as part of a path leading to said fuel valve.

4. The electromagnetically operable fuel injector according to claim 3, wherein said at least one-second aperture is oriented at a generally acute angle with respect to the longitudinal axis.

5. The electromagnetically operable fuel injector according to claim 4, further comprising a valve body positioned downstream of said armature and having at least one aperture in a wall portion thereof for reception of fuel from at least two of said flow paths of gaseous fuel from said armature and said fuel inlet connector.

6. The electromagnetically operable fuel injector according to claim 5, wherein said fuel inlet connector is positioned above said armature and is spaced from said armature by said working gap, said fuel inlet connector defining a through passage for directing fuel toward said armature and said fixed valve seat.

7. The electromagnetically operable fuel injector according to claim 6, wherein said fuel inlet connector comprises an upper end portion adapted for reception of gaseous fuel from a fuel source, and a lower end portion for discharging gaseous fuel, said lower end portion having a lower surface which faces an upper surface of said armature, said lower surface of said fuel inlet connector having a plurality of radially extending raised pads defined thereon, said pads having recessed portions therebetween to permit fuel to flow therethrough and across said working gap defined between said fuel inlet connector and said armature.

8. The electromagnetically operable fuel injector according to claim 7, wherein said generally cylindrical end portion of said valve needle has a generous radius at the lower end portion thereof for engagement with a correspondingly shaped surface of said valve seat.

9. The electromagnetically operable fuel injector according to claim 8, wherein said valve needle is attached to said armature by crimped portions.

10. The electromagnetically operable fuel injector according to claim 9, wherein said correspondingly shaped surface of said valve seat has a generally frust-oconical cross-sectional shape.

11. The electromagnetically operable fuel injector according to claim 10, wherein said fuel inlet connector further includes a fuel filter at an upper end portion thereof for filtering fuel.

12. An electromagnetically actuable fuel injector for a compressed natural gas fuel injection system of an internal combustion engine, said injector defining a generally longitudinal axis, which comprises:

a) a housing having a fuel inlet end portion and a fuel outlet end portion;

b) a fuel inlet connector positioned in said fuel inlet end portion of said housing for reception of gaseous fuel therein;

c) an armature positioned below said fuel outlet portion of said housing adjacent said fuel inlet connector and defining a generally central opening for reception of fuel from said fuel inlet connector, said armature being spaced from said fuel inlet connector to define a working gap, and being adapted to actuate a valve closing element positioned at the lower end portion thereof which interacts with a fixed fuel valve having a valve seat associated with said housing so as to selectively permit gaseous fuel to flow through a valve aperture associated with said fixed valve seat;

d) a ferromagnetic core;

e) a magnetic coil at least partially surrounding said ferromagnetic core, said magnetic coil for moving said armature and said valve closing element away from said fixed valve seat and toward said fuel inlet connector when said magnetic coil is energized so as to permit fuel to flow through said fixed valve seat;

f) a resilient device to bias said armature and said valve closing element to move toward said fixed valve seat when said magnetic coil system is deenergized;

g) a valve closing element attached to said armature and positioned to be selectively moved toward and away from said fixed valve seat, said valve closing element being a generally elongated valve needle having a generally central shaft portion and a spherically shaped end portion configured and adapted to engage a frusto-conically shaped surface of said fixed valve seat to close said valve, and movable therefrom to open said valve to permit said fuel to pass therethrough toward the internal combustion engine, said spherically shaped end portion having a diameter greater than said generally central shaft portion; and h) a lower needle guide positioned about said spherically shaped end portion to guide the upward and downward movement of said needle, a center of radius of said spherically shaped end portion of said needle is located generally coincident with said lower needle guide.

13. The electromagnetically actuable fuel injector according to claim 12, wherein said needle valve is connected to the lower end portion of said armature by crimped portions.

14. The electromagnetically actuable fuel injector according to claim 12, wherein said spherically shaped end portion on said needle has a diameter approximately 1.75 millimeters.

15. The electromagnetically operable fuel injector according to claim 12, wherein said center of said spherically shaped needle end surface is located at the center of the widthwise dimension of said lower needle guide and coincident with the lowermost surface of said lower needle guide.

16. The electromagnetically operable fuel injector according to claim 15, wherein said fuel inlet connector and said armature are adapted to permit a first flow path of gaseous fuel between said armature and said magnetic coil as part of a path leading to said fuel valve.

17. The electromagnetically operable fuel injector according to claim 16, wherein said armature defines at least one first fuel flow aperture extending through a wall portion thereof to define a second flow path of gaseous fuel as part of a path leading to said fuel valve.

18. The electromagnetically operable fuel injector according to claim 17, wherein said armature defines at least one second aperture in a wall portion to define a third flow path of gaseous fuel as part of a path leading to said fuel valve.

19. The electromagnetically operable fuel injector according to claim 18, wherein said at least one-second aperture is oriented at a generally acute angle with respect to the longitudinal axis.

20. The electromagnetically operable fuel injector according to claim 19, further comprising a valve body positioned downstream of said armature and having at least one aperture in a wall portion thereof for reception of fuel from at least two of said flow paths of gaseous fuel from said armature and said fuel inlet connector.

21. The electromagnetically operable fuel injector according to claim 20, wherein said fuel inlet connector is positioned above said armature and is spaced from said armature by a working gap, said fuel inlet connector defining a through passage for directing fuel toward said armature and said fixed valve seat.

22. The electromagnetically operable fuel injector according to claim 21, wherein said fuel inlet connector comprises an upper end portion adapted for reception of gaseous fuel from a fuel source, and a lower end portion for discharging gaseous fuel, said lower end portion having a lower surface which faces an upper surface of said armature, said lower surface of said fuel inlet connector having a plurality of radially extending raised pads defined thereon, said pads having recessed portions therebetween to permit fuel to flow therethrough and across, working gap defined between said fuel inlet connector and said armature.

23. An electromagnetically operable fuel injector for a fuel injection system of an internal combustion engine, said injector having a generally longitudinal axis, which comprises:

a) a ferromagnetic core;

b) a magnetic coil at least partially surrounding the ferromagnetic core;

c) an armature magnetically coupled to said magnetic coil and being movably responsive to said magnetic coil, said armature being adapted to actuate a valve closing element interactive with a fixed valve seat and being movable away from said fixed valve seat when said magnetic coil is excited, said armature having a generally cylindrical shape and a generally central opening for axial reception of fuel from a fuel inlet connector positioned adjacent thereto;

d) a valve closing element attached to said armature and positioned to be selectively moved toward and away from said fixed valve seat, said valve closing element being an elongated valve needle having a generally central shaft portion and a generally cylindrical end portion, said generally cylindrical end portion having a diameter greater than said generally central shaft portion and having a valve sealing surface having a generally spherical shape for engagement and disengagement with said fixed valve seat; and e) a lower valve needle guide positioned adjacent said generally cylindrical end portion of said valve needle for guiding said generally cylindrical end portion when said valve needle is moved upwardly from said fixed valve seat and downwardly toward said fixed valve seat;

said valve needle being located with respect to said lower valve needle guide whereby the center of generation of said spherical end surface is generally centrally positioned and coincident with said lowermost surface of said lower valve needle guide.

* * * * *